(12) United States Patent
Kessel

(10) Patent No.: US 9,941,949 B2
(45) Date of Patent: Apr. 10, 2018

(54) MANAGING WIRELESSLY TRANSMITTED USE-DATA IN A WIRELESS DATA TRANSMISSION ENVIRONMENT

(71) Applicant: NXP B.V., Eindhoven (NL)

(72) Inventor: Martin Kessel, Dresden (DE)

(73) Assignee: NXP B.V., Eindhoven (NL)

( * ) Notice: Subject to any disclaimer, the term of this patent is extended or adjusted under 35 U.S.C. 154(b) by 122 days.

(21) Appl. No.: 14/266,379

(22) Filed: Apr. 30, 2014

(65) Prior Publication Data

US 2014/0335806 A1    Nov. 13, 2014

(30) Foreign Application Priority Data

May 8, 2013    (EP) .................................... 13167123

(51) Int. Cl.
*H04B 7/08*    (2006.01)

(52) U.S. Cl.
CPC ......... *H04B 7/0871* (2013.01); *H04B 7/0817* (2013.01)

(58) Field of Classification Search
CPC ............................ H04B 7/0871; H04B 7/0817
See application file for complete search history.

(56) References Cited

U.S. PATENT DOCUMENTS

| | | | | |
|---|---|---|---|---|
| 6,792,258 B1* | 9/2004 | Nokes | ................. | H04B 7/0871 375/347 |
| 7,034,898 B1 | 4/2006 | Zahm et al. | | |
| 2005/0054304 A1 | 3/2005 | Gierl et al. | | |
| 2006/0148433 A1* | 7/2006 | Welnick | ............... | H04B 7/0817 455/140 |
| 2007/0129020 A1* | 6/2007 | Anton-Becker | ....... | H04B 7/082 455/78 |
| 2007/0178897 A1* | 8/2007 | Lagnado | ............... | H04W 48/16 455/434 |
| 2008/0098439 A1* | 4/2008 | Taura | ................... | H04B 7/0874 725/75 |

FOREIGN PATENT DOCUMENTS

| | | |
|---|---|---|
| EP | 0 967 746 A2 | 12/1999 |
| EP | 2 372 926 A1 | 10/2011 |

OTHER PUBLICATIONS

Extended European Search Report for application No. 13167123.2 (dated Oct. 15, 2013).

* cited by examiner

*Primary Examiner* — Yuwen Pan
*Assistant Examiner* — Fatuma Sherif

(57) ABSTRACT

A method of managing wirelessly transmitted use-data in a wireless data transmission environment, the method comprising: Receiving the wirelessly transmitted use-data by a first receiver and estimating a reception quality of the use-data received by the first receiver by applying a quality criterion. In case the reception quality meets the quality criterion, the method moreover comprises using a second receiver for background scanning the wireless data transmission environment, and in case the reception quality does not meet the quality criterion, the method moreover comprises using the second receiver additionally for reception of the use-data, thus providing both receivers for a diversity reception of the use-data.

12 Claims, 2 Drawing Sheets

MANAGING WIRELESSLY TRANSMITTED USE-DATA IN A WIRELESS DATA TRANSMISSION ENVIRONMENT

FIELD OF THE INVENTION

The present invention is related to a device for receiving and managing use-data in a wireless data transmission environment as well as to a corresponding managing method. The data transmission environment is preferably a digital broadcasting or another cellular environment. The present invention is directed to the receiving of broadcast messages and to background scanning the data transmission environment in order to provide the receivable channels of the actual data transmission environment, by using antenna diversity receivers.

BACKGROUND OF THE INVENTION

Today's digital broadcast and cellular receivers are often using antenna diversity reception (e.g. Maximum-ratio combining) to improve the reception quality. Additionally to the signal receptions the receivers need also to do background scanning, especially for broadcast systems. In conventional receivers, there is implemented one tuner for reception of the use-data and one tuner for background scanning.

OBJECT AND SUMMARY OF THE INVENTION

It is an object of the invention to provide an optimized managing of wireless transmitted use-data in a wireless data transmission environment.

In order to achieve the object defined above, a method for managing of wireless transmitted use-data in a wireless data transmission environment and a device for receiving and managing of wireless transmitted use-data in a wireless data transmission environment, according to the independent claims are provided.

According to an exemplary embodiment of the invention a method of managing wirelessly transmitted use-data in a wireless data transmission environment is provided. The method comprises: Receiving the wirelessly transmitted use-data by a first receiver, estimating a reception quality of the use-data received by the first receiver by applying a quality criterion. In case the reception quality meets the quality criterion, a second receiver for background scanning the wireless data transmission environment is used. In case the reception quality does not meet the quality criterion, the second receiver is used additionally for reception of the use-data, thus providing both receivers for a diversity reception of the use-data Use-data in the sense of the embodiments of the invention may be data, desired to be received by an user.

A receiver in the sense of the embodiments of the invention may be a device operable for receiving the signal containing the use-data and extracting the use-data from the signal for providing the use-data to an user.

The reception quality in the sense of the embodiments of the invention may be a signal quality of the receivable signal containing the use-data.

A quality criterion in the sense of the embodiments of the invention may be any criterion applicable for a predication, if the signal or the quality of the signal is sufficient for extracting the use-data by the receiver without significant loss of data.

Background scanning in the sense of the embodiments of the invention may be the scanning of the wavelength range of a respective wireless data transmission environment, in order to find frequencies, center frequencies or frequency ranges which contain use-data.

Diversity reception in the sense of the embodiments of the invention may be a decision of how to proceed with the received signals of each of the involved receivers. Therefore, the diversity reception may be a weighting of each of the received signals, thus be able of ignoring some of the received signals, choosing one of the signals to be used for extracting of the use-data or super positioning the received signals in order to enforce a combined total signal containing the use-data.

Diversity reception may be achieved for example by spatial diversity or by polarization diversity of the used receivers.

This embodiment provides at least the advantage of providing a method for an optimized managing of wirelessly transmitted use-data in a wireless data transmission environment.

According to another exemplary embodiment of the invention a device for managing wirelessly transmitted use-data in a wireless data transmission environment is provided. The device comprises: A first receiver and a second receiver, each being adapted to operate in the wireless data transmission environment. The first receiver is been adapted for receiving the wirelessly transmitted use-data, while the second receiver is been adapted for selectively receiving the use-data or for background scanning the wireless data transmission environment. The device moreover comprises a quality-estimation unit being adapted for estimating a reception quality of the use-data received by the first receiver based on a quality criterion, and a decision unit being adapted for deciding that: In case the reception quality meets the quality criterion, the second receiver is used for background scanning the wireless data transmission environment, or in case the reception quality does not meet the quality criterion, the second receiver is used for receiving the use-data in addition to the first receiver, thus providing the first receiver and the second receiver for a diversity reception of the use-data.

This embodiment provides at least the advantage of providing a device for an optimized managing of wirelessly transmitted use-data in a wireless data transmission environment, wherein the device is capable of receiving the use-data.

According to another exemplary embodiment of the invention a computer-readable medium is provided, in which a computer program of managing wirelessly transmitted use-data in a wireless data transmission environment is stored which, when being executed by a processor, is adapted to control or carry out the method according to the independent method claim 1.

This embodiment provides at least the advantage of providing an easy way of providing the method of managing wirelessly transmitted use-data in a wireless data transmission environment to a device for managing wirelessly transmitted use-data in a wireless data transmission environment as claimed by the invention.

According to another exemplary embodiment of the invention a program element of managing wirelessly transmitted use-data in a wireless data transmission environment, which, when being executed by a processor, is adapted to control or carry out the method according to the independent method claim 1.

This embodiment provides at least the advantage of providing an easy way of controlling or carrying out the method of managing wirelessly transmitted use-data in a wireless data transmission environment in a device for managing wirelessly transmitted use-data in a wireless data transmission environment as claimed by the invention.

In the following, further exemplary embodiments of the method and the device will be explained.

According to another exemplary embodiment of the invention the method may further comprise adding an additional receiver forming part of a background-scan group, thus providing the additional receiver for background scanning the wireless data transmission environment. And in case both the first receiver and the second receiver are used for diversity reception of the use-data, both the first receiver and the second receiver forming part of a diversity-reception group. Moreover in this case the method comprises estimating a reception quality of the diversity-reception group based on the quality criterion, and for as long as the reception quality of the diversity-reception group does not meet the quality criterion, the method moreover comprises: Removing the additional receiver from the background-scan group, and adding the additional receiver to the diversity-reception group, thus providing the additional receiver for the diversity reception of the use-data.

The background-scan group in the sense of the embodiments of the invention may be a container, in which all receivers are logically arranged, which shall be used for background scanning the wireless data transmission environment.

The diversity-reception group in the sense of the embodiments of the invention may be a container, in which all receivers are logically arranged, which shall be used for diversity-reception of a signal of the wireless data transmission environment, containing the use-data.

This embodiment provides at least the advantage of providing a better optimization of the available receivers, such that only the receiver(s) needed for a good reception of the use-data are applied to diversity-receiving of the use-data, while the other still available receiver(s) may be used for background scanning of the wireless data transmission environment.

According to another exemplary embodiment of the invention the method may further comprise adding an additional receiver used for diversity reception of the use-data, adding any receiver which is used for diversity-reception of the use-data to a diversity-reception group, thus providing any receiver which is part of the diversity-reception group for diversity-reception of the use-data, adding any receiver which is used for background scanning the wireless data transmission environment to a background-scan group, thus providing any receiver which is part of the background-scan group for background scanning the wireless data transmission environment, estimating a reception quality of the diversity-reception group based on the quality criterion, and deciding to remove a receiver of the diversity-reception group from the diversity-reception group and adding said receiver to the background-scan group and thus providing said receiver for background scanning the wireless data transmission environment, in case the reception quality of the diversity-reception group would still meet the quality criterion even if said receiver of the diversity-reception group would be removed from the diversity-reception group.

This embodiment provides at least the advantage of providing another better optimization of the available receivers, such that only one or some receiver(s) which are not needed for a good reception of the use-data are applied to background scanning the wireless data transmission environment, while the other still available receiver(s) may be used for diversity-reception of the use-data.

According to another exemplary embodiment of the invention the device for managing wirelessly transmitted use-data in a wireless data transmission environment may further comprise an additional receiver, forming part of a background-scan group, thus providing the additional receiver for background scanning the wireless data transmission environment. In case both the first receiver and the second receiver are used for diversity reception of the use-data, both the first receiver and the second receiver form part of a diversity-reception group. Moreover the quality-estimation unit is further adapted for estimating a reception quality of the diversity-reception group based on the quality criterion. The decision unit is further adapted for deciding as long as the reception quality of the diversity-reception group does not meet the quality criterion, that the additional receiver of the background-scan group is removed from the background-scan group and is added to the diversity-reception group and thus used for receiving the use-data, thus providing the additional receiver for the diversity reception of the use-data.

This embodiment provides at least a combined advantage: In first, more receivers may be used for diversity-receiving, which may enforce reception quality, and in second, more receivers may be used for background scanning the wireless data transmission environment, which may enhance the rate of finding and providing channels of use-data within the wavelength range of the respective wireless data transmission environment.

According to another exemplary embodiment of the invention the device for managing wirelessly transmitted use-data in a wireless data transmission environment may further comprise an additional receiver being adapted for selectively receiving the use-data or for back-ground scanning the wireless data transmission environment. The additional receiver is used for receiving the use-data. Any receiver which is used for receiving of the use-data is added to a diversity-reception group, thus providing any receiver which is part of the diversity-reception group for diversity-reception of the use-data. Any receiver which is used for background scanning the wireless data transmission environment is added to a background-scan group, thus providing any receiver which is part of the background-scan group for background scanning the wireless data transmission environment. The quality-estimation unit is further adapted for estimating a reception quality of the diversity-reception group based on the quality criterion, and the decision unit is further adapted for deciding in case the reception quality of the diversity-reception group would still meet the quality criterion even if a receiver of the diversity-reception group would be removed from the diversity-reception group, that a receiver of the diversity-reception group is been removed from the diversity-reception group and is been added to the background-scan group and thus providing said receiver for background scanning the wireless data transmission environment.

This embodiment provides at least a combined advantage: In first, more receivers may be used for diversity-receiving, which may enforce reception quality, and in second, more receivers may be used for background scanning the wireless data transmission environment, which may enhance the rate of finding and providing channels of use-data within the wavelength range of the respective wireless data transmission environment.

According to another exemplary embodiment of the invention the device may further comprise that each receiver comprises an antenna for physically receiving electromagnetic radiation including the use-data and a tuner for extracting the use-data from the received electromagnetic radiation.

By providing more than one antenna in the device, at least one antenna may be arranged in a different way than the first antenna.

If the antennas provide for example spatial diversity, the antennas of the receivers may be provided in a displacement arrangement, but with the same orientation.

Another example of the arrangement of the antennas may be an arrangement for polarization diversity. For that matter two antennas may be arranged in an angle of 90° to each other.

If more than two antennas are used in the device, the antennas may even be arranged in a combined manner, providing for spatial diversity as well as for polarization diversity.

This embodiment provides at least the advantage of providing a receiver, which may be used for receiving the signal containing the use-data and for extracting the use-data from the received signal, therefore providing a device which may be manufactured in a smaller way and by less production costs, by using the integrated components.

According to another exemplary embodiment of the invention the device may further comprise that the quality criterion of the received use-data is equal to or higher than a predetermined threshold.

For example the predetermined threshold may be a threshold for a signal-to-noise ratio.

This embodiment provides at least the advantage of providing an easy way for deciding, whether the signal quality is good enough for receiving the signal containing the use-data.

According to another exemplary embodiment of the invention the device may further comprise that the diversity reception of the use-data comprises choosing the use-signal of said receiver provided for the diversity reception of the use-data, which provides the highest signal-quality.

This embodiment provides at least the advantage of receiving only the signal, which has the highest signal-quality, thus enhancing the processing speed as only the use-data of this received signal needs to be extracted and processed.

According to another exemplary embodiment of the invention the device may further comprise that the diversity reception of the use-data comprises combining the use-signals of at least two receivers provided for the diversity reception of the use-data, thus providing a higher signal-quality than the signal-quality of said receiver provided for the diversity reception of the use-data, which provides the highest signal-quality.

This embodiment provides at least the advantage of an improved signal quality for the desired receivable signal.

According to another exemplary embodiment of the invention the device may further comprise that the use-data is use-data provided by a digital broadcasting environment, preferably including broadcasting information.

This embodiment provides at least the advantage that digital broadcasting information may be received and managed.

According to another exemplary embodiment of the invention the digital broadcast environment is a digital audio and/or digital video broadcasting environment, preferably for a mobile use.

This embodiment provides at least the advantage of being able to receive digital audio and/or digital video broadcasting information. Moreover this embodiment may have the advantage of being able to receive such information even during mobile use, for example on a bike or in a car.

According to another exemplary embodiment of the invention the device may further comprise that the digital broadcast environment is a terrestrial digital audio and/or digital video broadcasting environment This embodiment provides at least the advantage of being able to receive digital terrestrial broadcasting information, which may be useful during mobile use of the device, particularly at higher speeds, like for example when traveling in a car or train.

According to another exemplary embodiment of the invention the device may further comprise that the use-data is use-data provided by a cellular environment, preferably a cellular phone network environment.

A cellular environment may be any environment which is arranged in a cellular way. A cellular environment may allow for a handover of the receiving device from one base station to another base station during mobile use of the device.

This embodiment provides at least the advantage of being able to receive cellular environment information, which may be useful during mobile use of the device.

According to another exemplary embodiment of the invention the device may further comprise that the device is configured as a mobile communication device, preferably one of the group consisting of a mobile communication phone, a smartphone, a Digital Audio Broadcasting device and/or a Digital Video Broadcasting device.

This embodiment provides at least the advantage of being able to use common known devices or multifunctional devices, which might only need for a software update for being able to provide the reception of the desired use-data.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
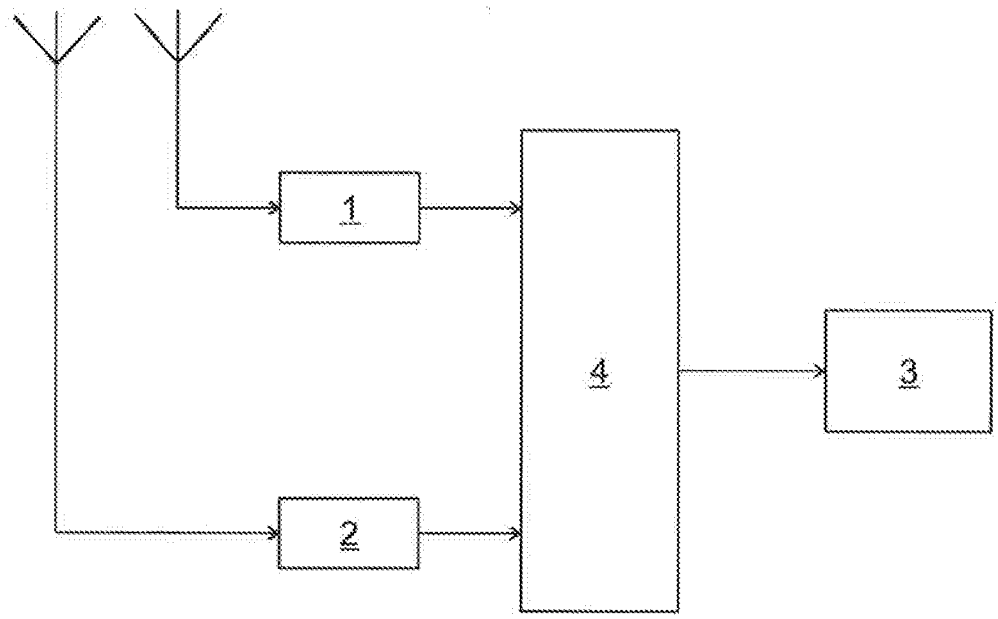
FIG. 1 illustrates a block diagram of a proposed device for managing wirelessly transmitted use-data in a wireless data transmission environment according to an exemplary embodiment of the invention.

The illustration in the drawing is schematical. In different drawings, similar or identical elements are provided with the same reference signs.

Figure 2:
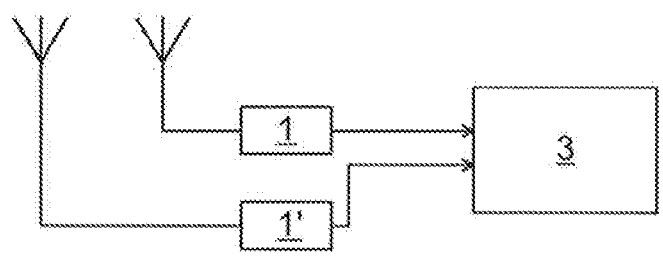
FIG. 2 illustrates a block diagram of a conventional device for managing wirelessly transmitted use-data in a wireless data transmission environment.

FIG. 2 illustrates a block diagram of a conventional device for managing wirelessly transmitted use-data in a wireless data transmission environment.

The illustrated device in FIG. 2 provides two receivers 1, 1', each comprising an antenna and a tuner 1, 1'. The first tuner 1 is adapted for receiving of the signal containing the use-data, while the second tuner 1' is adapted for background scanning the wireless data transmission environment. Both tuners are connected to a control unit 3, for providing a channel table of the receivable channels and for providing the use-data of a user selectable channel out of the channel table.

FIG. 1 illustrates a block diagram of a proposed device for managing wirelessly transmitted use-data in a wireless data transmission environment according to an exemplary embodiment of the invention.

The illustration in FIG. 1 provides a device for managing wirelessly transmitted use-data in a wireless data transmission environment, the device comprising: A first receiver 1 and a second receiver 2, each being adapted to operate in the wireless data transmission environment. The first receiver 1 is been adapted for receiving the wirelessly transmitted use-data. The second receiver is been adapted for selectively receiving the use-data or for background scanning the wireless data transmission environment. The device moreover provides a quality-estimation unit 4 being adapted for estimating a reception quality of the use-data received by the first receiver 1 based on a quality criterion, and a decision unit 4 being adapted for deciding that: In case the reception quality meets the quality criterion, the second receiver 2 is used for background scanning the wireless data transmission environment, or in case the reception quality does not meet the quality criterion, the second receiver 2 is used for receiving the use-data in addition to the first receiver 1, thus providing the first receiver 1 and the second receiver 2 for a diversity reception of the use-data.

Thus the idea of the presented invention is to combine the diversity functionality with the background scan in a device with N antennas/tuners/receivers 1, 2. In case of bad reception conditions more antennas/tuners/receivers 1, 2 are used for diversity reception (up to N in worst case). In case of good reception conditions one ore multiple antennas/tuners/receivers 1, 2 (M) are used for background scanning. In FIG. 1 the quality estimation unit 4 and the decision unit 4 are provided together as one signal processing unit 4. The quality estimation unit 4 itself is estimating the signal quality in a continuous way and if background scan is possible and how many antennas/tuners/receivers 1, 2 can be used for it.

Figure 3:
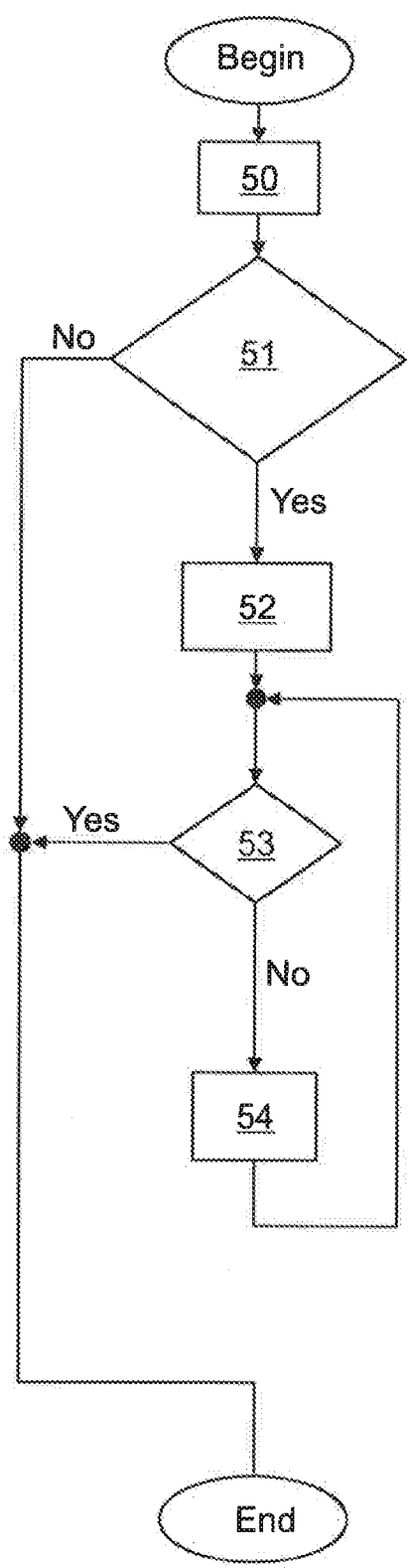
FIG. 3 illustrates a flow diagram of a proposed method for managing wirelessly transmitted use-data in a wireless data transmission environment according to an exemplary embodiment of the invention.

FIG. 3 illustrates a flow diagram of a proposed method for managing wirelessly transmitted use-data in a wireless data transmission environment according to an exemplary embodiment of the invention.

The illustration in FIG. 3 provides a method of managing wirelessly transmitted use-data in a wireless data transmission environment. The method comprises (not shown):

receiving the wirelessly transmitted use-data by a first receiver, estimating a reception quality of the use-data received by the first receiver by applying a quality criterion, in case the reception quality meets the quality criterion, using a second receiver for background scanning the wireless data transmission environment, in case the reception quality does not meet the quality criterion, using the second receiver additionally for reception of the use-data, thus providing both receivers for a diversity reception of the use-data.

Moreover FIG. 3 illustrates, that the method may further comprise:

adding an additional receiver forming part of a background-scan group 50, thus providing the additional receiver for background scanning the wireless data transmission environment, in case 51 both the first receiver and the second receiver are used for diversity reception of the use-data, both the first receiver and the second receiver forming part of a diversity-reception group 52, estimating a reception quality of the diversity-reception group based on the quality criterion, for as long as the reception quality of the diversity-reception group does not meet the quality criterion 53, removing 54 the additional receiver from the background-scan group, and adding 54 the additional receiver to the diversity-reception group, thus providing the additional receiver for the diversity reception of the use-data.

In normal IC's each reception path needs an own tuner 1, 1'. The current idea is to use the internal tuners 1, 2 for diversity reception to improve the reception quality. For example, both tuners/antennas/receivers 1, 2 are receiving the same signal, for example a same radio station, and the signal processing unit 4 combines these two signals to one "better" signal. An additional internal or external tuner (not shown) should offer the costumer the capability to do background scan in parallel. With the proposed idea, the costumer can spare the costly additional internal or external tuner (not shown). During driving the reception quality changes more or less fast. In case of good quality the diversity is not necessary and one tuner path 2 can be used for background scan without disturbing the reception. In case of a decreasing reception quality the system falls back to diversity reception and both tuners 2 are used for receiving the same signal. In this example and case, no background scan would occur for as long as the reception quality is not increasing again to fulfil the predefined threshold criterion.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

LIST OF REFERENCE NUMBERS 1 first antenna/receiver/tuner of a device
1' second antenna/receiver/tuner of a conventional device
2 second antenna/receiver/tuner of a device according to an exemplary embodiment of the invention
3 control unit
4 quality estimation unit/decision unit/signal processing unit
50 background-scan group
51 the first receiver and the second receiver are used for diversity reception of the use-data?
52 diversity-reception group
53 quality criterion met/fulfilled?
54 removing a receiver from the background-scan group, and adding said receiver to the diversity-reception group

The invention claimed is:

1. A method of managing wirelessly transmitted use-data in a wireless data transmission environment, the method comprising:

receiving the wirelessly transmitted use-data by a first receiver;

estimating a reception quality of the use-data received only by the first receiver by applying a quality criterion to the use-data received only by the first receiver;

in case the reception quality of the use-data received only by the first receiver meets the quality criterion, using a second receiver for background scanning the wireless data transmission environment;

in case the reception quality of the use-data received only by the first receiver does not meet the quality criterion, using both the second receiver and the first receiver as a diversity-reception group for a diversity reception of the use-data until a reception quality of the diversity-reception group does not meet the quality criterion, wherein the first receiver includes a first antenna and a first tuner configured to receive the wireless data and the second receiver includes a second antenna and a second tuner configured to receive the wireless data;

receiving the wireless data by a third receiver having a third antenna and a third tuner, wherein the first, second, and third antennas are configured in a combined manner to receive the wireless data using both spatial diversity and polarization diversity; and, in case the reception quality of the diversity-reception group does not meet the quality criterion, the use-data is selectively received from the first, second, and third receivers based on both the spatial diversity and the polarization diversity of the first, second and third antennas;

background scanning the wireless data transmission environment with the third receiver, wherein the third receiver forms part of a background-scan group;

estimating a reception quality of the diversity-reception group based on the quality criterion; and for as long as the reception quality of the diversity-reception group does not meet the quality criterion, removing the third receiver from the background-scan group, and adding the third receiver to the diversity-reception group, thus providing the third receiver for the diversity reception of the use-data.

2. The method according to claim 1, further comprising:

performing diversity reception of the use-data with the third receiver;

adding any receiver which is used for diversity-reception of the use-data to the diversity reception group, thus providing any receiver which is part of the diversity-reception group for diversity-reception of the use-data;

adding any receiver which is used for background scanning the wireless data transmission environment to a background-scan group, thus providing any receiver which is part of the background-scan group for background scanning the wireless data transmission environment;

estimating a reception quality of the diversity-reception group based on the quality criterion; and deciding to remove a receiver of the diversity-reception group from the diversity-reception group and adding said receiver to the background-scan group and thus providing said receiver for background scanning the wireless data transmission environment, in case the reception quality of the diversity-reception group would still meet the quality criterion even if a receiver of the diversity-reception group would be removed from the diversity-reception group.

3. The device according to claim 2, wherein the diversity reception of the use-data comprises combining the use-signals of at least two receivers provided for the diversity reception of the use-data, thus providing a higher signal-quality than the signal-quality of said receiver provided for the diversity reception of the use-data, which provides the highest signal-quality.

4. The device according to claim 2, wherein the use-data is use-data provided by a digital broadcasting environment.

5. The device according to claim 2, wherein the use-data is use-data provided by a cellular environment.

6. The device according to claim 2, wherein the device is configured as a mobile communication device.

7. A non-transitory computer-readable medium, in which a computer program of managing wirelessly transmitted use-data in a wireless data transmission environment is stored which, when being executed by a processor, is adapted to control or carry out the method according to claim 1.

8. A program element of managing wirelessly transmitted use-data in a wireless data transmission environment, which, when being executed by a processor, is adapted to control or carry out the method according to claim 1.

9. A device for managing wirelessly transmitted use-data in a wireless data transmission environment, the device comprising:

a first receiver and a second receiver, each being configured to operate in the wireless data transmission environment;

the first receiver configured to receive the wirelessly transmitted use-data;

the second receiver configured to selectively receive the use-data or to background scan the wireless data transmission environment;

a quality-estimation unit configured to estimate a reception quality of the use-data received by the first receiver based on a quality criterion applied to the use-data received only by the first receiver;

a decision unit configured to decide that, in case the reception quality of the use-data received only by the first receiver meets the quality criterion, the second receiver is used for background scanning the wireless data transmission environment, or in case the reception quality of the use-data received only by the first receiver does not meet the quality criterion, both the first receiver and the second receiver are used as a diversity-reception group for a diversity reception of the use-data until a reception quality of the diversity-reception group does not meet the quality criterion, wherein the first receiver includes a first antenna and a first tuner for receiving the wireless data and the second receiver includes a second antenna and a second tuner for receiving the wireless data; and a third receiver, having a third antenna and a third tuner, wherein the first, second and third antennas are configured in a combined manner to receive the wireless data using both spatial diversity and polarization diversity; and in case the reception quality of the diversity-reception group does not meet the quality criterion, the use-data is selectively received from the first, second and third receivers based on both the spatial diversity and the polarization diversity of the first, second and third antennas;

wherein the third receiver forms part of a background-scan group and is configured for background scanning the wireless data transmission environment; and wherein the quality-estimation unit is further configured to estimate a reception quality of the diversity-reception group based on the quality criterion, and the decision unit is further configured to decide as long as the reception quality of the diversity-reception group does not meet the quality criterion, that the third receiver of the background-scan group is removed from the background-scan group and is added to the diversity-reception group and thus used for receiving the use-data, thus providing the third receiver for the diversity reception of the use-data.

10. The device according to claim 9, wherein the third receiver is configured for selectively receiving the use-data or for background scanning the wireless data transmission environment, any receiver which is used for receiving of the use-data is added to a diversity-reception group, thus providing any receiver which is part of the diversity-reception group for diversity-reception of the use-data, any receiver which is used for background scanning the wireless data transmission environment is added to a background-scan group, thus providing any receiver which is part of the background-scan group for background scanning the wireless data transmission environment, wherein the quality-estimation unit is further configured for estimating a reception quality of the diversity-reception group based on the quality criterion, and the decision unit is further configured for deciding in case the reception quality of the diversity-reception group would still meet the quality criterion even if a receiver of the diversity-reception group would be removed from the diversity-reception group, that a receiver of the diversity-reception group is been removed from the diversity-reception group and is been added to the background-scan group and thus providing said receiver for background scanning the wireless data transmission environment.

11. The device according to claim 9, wherein the quality criterion of the received use-data is equal to or higher than a predetermined threshold.

12. The device according to claim 9, wherein the diversity reception of the use-data comprises choosing the use-signal of said receiver provided for the diversity reception of the use-data, which provides the highest signal-quality.

* * * * *